US012795288B2

(12) United States Patent
Xu et al.

(10) Patent No.: US 12,795,288 B2
(45) Date of Patent: Nov. 10, 2026

(54) EARPHONES

(71) Applicant: SHENZHEN SHOKZ CO., LTD., Shenzhen (CN)

(72) Inventors: Jiang Xu, Shenzhen (CN); Cai Hu, Shenzhen (CN); Zeying Zheng, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 245 days.

(21) Appl. No.: 18/786,558

(22) Filed: Jul. 28, 2024

(65) Prior Publication Data

US 2024/0388834 A1 Nov. 21, 2024

Related U.S. Application Data

(63) Continuation of application No. PCT/CN2022/116220, filed on Aug. 31, 2022.

(51) Int. Cl.
*H04R 1/10* (2026.01)
*H04R 1/1025* (2026.01)

(52) U.S. Cl.
CPC ........... *H04R 1/105* (2013.01); *H04R 1/1016* (2013.01); *H04R 1/1025* (2013.01); *H04R 1/1066* (2013.01)

(58) Field of Classification Search
CPC ........ H04R 1/10; H04R 1/105; H04R 1/1066; H04R 25/607; H04R 25/652; H04R 2225/0213
See application file for complete search history.

(56) References Cited

U.S. PATENT DOCUMENTS 5,412,736 A * 5/1995 Keliiliki ................. H04R 1/105 381/381
6,748,094 B1 * 6/2004 Tziviskos ............ H04R 25/607 381/322

(Continued)

FOREIGN PATENT DOCUMENTS

CN 209659556 U 11/2019
CN 212752606 U 3/2021

(Continued)

OTHER PUBLICATIONS

The Extended European Search Report in European Application No. 22956874.6 mailed on Mar. 18, 2025, 9 pages.

(Continued)

*Primary Examiner* — Ryan Robinson
(74) *Attorney, Agent, or Firm* — METIS IP LLC

(57) ABSTRACT

Disclosed relates to an earphone, comprising a hook portion and a retention portion connected to the hook portion, at least a part of the hook portion is configured to hang between a rear side of an ear of a user and the head of the user, and the retention portion is configured to contact a front side of the ear of the user. In a wearing state, a free end of the retention portion that is not connected to the hook portion extends into a concha cavity of the ear to make the retention portion inclinedly disposed relative to a sagittal axis of the user, which is conducive to increasing a distance between the center of gravity of the retention portion and an upper auricular root of the ear, i.e., to lowering the center of gravity of the retention portion in the wearing state, and thereby improving the stability of the earphone.

20 Claims, 8 Drawing Sheets

(56) References Cited

U.S. PATENT DOCUMENTS

| | | | | |
|---|---|---|---|---|
| 11,838,705 | B2 | 12/2023 | Zheng et al. | |
| 2004/0170294 | A1 * | 9/2004 | Murozaki | H04R 1/105 381/381 |
| 2005/0100185 | A1 * | 5/2005 | Connors | H04R 1/105 381/381 |
| 2017/0195770 | A1 * | 7/2017 | Cheney | H04R 1/1016 |
| 2017/0295269 | A1 * | 10/2017 | Hosoi | H04R 1/1008 |
| 2025/0071465 | A1 | 2/2025 | Yan et al. | |

FOREIGN PATENT DOCUMENTS

| | | | | |
|---|---|---|---|---|
| CN | 113301463 | A | 8/2021 | |
| CN | 114189778 | A | 3/2022 | |
| CN | 114339511 | A | 4/2022 | |
| CN | 216752043 | U | 6/2022 | |
| CN | 217011135 | U | 7/2022 | |
| DE | 3831207 | C2 * | 9/1997 | H04M 1/05 |
| EP | 4181531 | A1 | 5/2023 | |
| JP | 2001160996 | A | 6/2001 | |
| WO | WO-9010361 | A1 * | 9/1990 | G02C 11/10 |
| WO | WO-9515044 | A1 * | 6/1995 | H04R 1/105 |

OTHER PUBLICATIONS

International Search Report in PCT/CN2022/116220 mailed on May 15, 2023, 6 pages.
Written Opinion in PCT/CN2022/116220 mailed on May 15, 2023, 5 pages.

* cited by examiner

EARPHONES

CROSS-REFERENCE TO RELATED APPLICATIONS

This application is a continuation of International Application No. PCT/CN2022/116220, filed on Aug. 31, 2022, the entire contents of which are hereby incorporated by reference.

TECHNICAL FIELD

The present disclosure relates to the technical field of electronic devices, and in particular, to earphones.

BACKGROUND

With the continuous popularization of electronic devices, the electronic devices have become indispensable tools for socializing and entertainment in people's daily lives. The electronic devices such as earphones are now widely and can be paired with cell phones, computers, and other terminal equipment to provide users with an immersive audio experience. Based on the working principle of the earphones, the earphones can generally be categorized into air-conducting earphones and bone-conducting earphones. Based on how the earphones are worn, the earphones can generally be categorized into headsets, ear-hanging earphones, and in-ear earphones. Based on the way of interaction between the earphones and the electronic devices, the earphones can generally be categorized into wired earphones and wireless earphones.

SUMMARY

Embodiments of the present disclosure provide an earphone. The earphone comprises a hook portion and a retention portion connected to the hook portion, at least a portion of the hook portion is configured to hang between a rear side of an ear of a user and the head of the user, and the retention portion is configured to contact a front side of the ear. In a wearing state, a free end of the retention portion that is not connected to the hook portion extends into a concha cavity of the ear.

The beneficial effect of the present disclosure is that: the free end of the retention portion of the earphone that is not connected to the hook portion extends into the concha cavity of the ear in the wearing state, so to make the retention portion inclinedly disposed with respect to a sagittal axis of the user, which is conducive to increasing a distance between the center of gravity of the retention portion and an upper auricular root of the ear, i.e., lowering the center of gravity of the retention portion in the wearing state, thereby improving the stability of the earphone when the earphone is worn.

BRIEF DESCRIPTION OF THE DRAWINGS

In order to more clearly illustrate the technical solutions in the embodiments of the present disclosure, the following will briefly introduce the accompanying drawings that need to be used in the description of the embodiments. It is obvious that the following drawings are only some of the embodiments of the present disclosure, and for the ordinary skilled person in the field, other drawings can be obtained according to these drawings without creative labor.

DETAILED DESCRIPTION

The present disclosure is described in further detail below in conjunction with the accompanying drawings and embodiments. In particular, it is noted that the following embodiments are only used to illustrate the present disclosure, but do not limit the scope of the present disclosure. Similarly, the following embodiments are only part of the embodiments of the present disclosure rather than all of the embodiments, and all other embodiments obtained by a person of ordinary skill in the art without creative labor fall within the scope of protection of the present disclosure.

References to "embodiments" in the present disclosure mean that particular features, structures, or characteristics described in conjunction with embodiments may be included in at least one embodiment of the present disclosure. It is understood by those of skill in the art, both explicitly and implicitly, that the embodiments described in the present disclosure may be combined with other embodiments.

Figure 1:
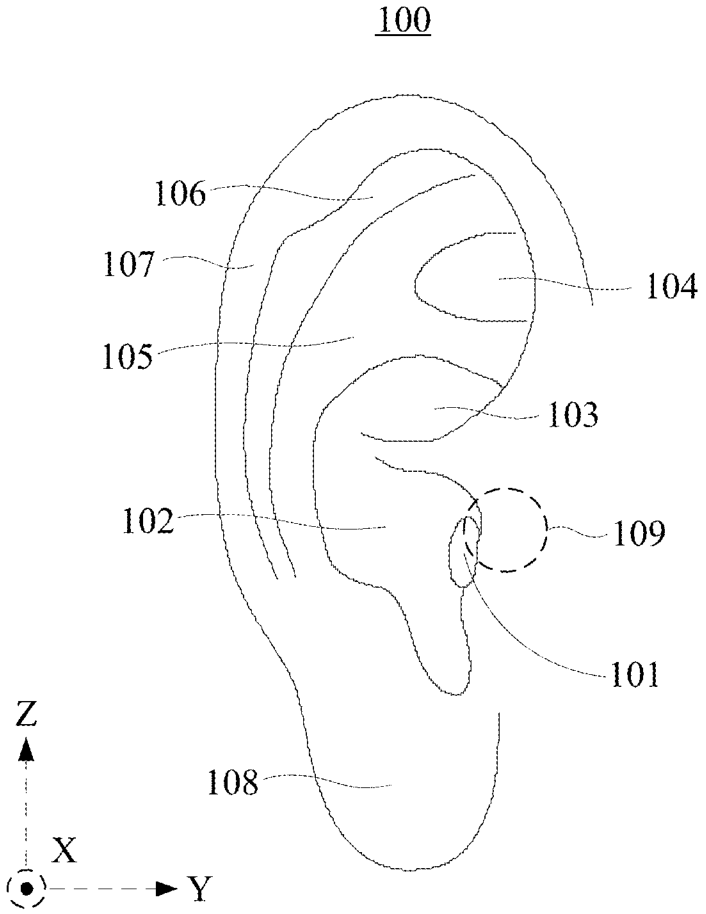
FIG. 1 is a schematic diagram illustrating an exemplary contour of a front side of an ear of a user according to the present disclosure.

In conjunction with FIG. 1, in an ear 100 of a user, in addition to an ear canal 101 and a concha cavity 102 near the ear canal 101, each of a cymba conchae 103, a triangular fossa 104, and other parts also has a certain depth and a certain volume in a three-dimensional space. Thus, the cymba conchae 103, the triangular fossa 104 and other parts may also be used to wear an earphone. In other words, by rationally designing a structure of the earphone and using parts of the user's ear 100 other than the ear canal 101, the earphone can also be worn and mechanical vibration propagation of the earphone can be realized. In this manner, the ear canal 101 of the user can be "liberated", which can not only be conducive to the health of the user but also reduce the probability of the occurrence of a traffic accident. Based on this, the present disclosure proposes an earphone that mainly utilizes an upper part of the user's ear 100 (e.g., a region where the concha cavity 102, the cymba conchae 103, the triangular fossa 104, an anthelix 105, a scapha 106, a helix 107, or the like are located) in order to realize the wearing of the earphone and the propagation of the mechanical vibration. Of course, in order to improve the comfort and reliability of an earphone 10 when the earphone 10 is worn, it is also possible to further utilize an earlobe 108 of the user and other regions.

It should be noted that although the ear canal has a certain depth and can extend to a tympanic membrane, for the sake of convenience of description, and in conjunction with FIG. 1, in the present disclosure, when not otherwise specified, the term "ear canal" specifically refers to an inlet of the ear canal away from the tympanic membrane, i.e., an ear opening. Furthermore, in the present disclosure, "a front side of an ear" is a concept relative to "a rear side of an ear". For example, in FIG. 1, the front side of an ear refers to a side of an ear that is away from the head, and the rear side of an ear refers to a side of the ear that faces the head. Both of the front side of an ear and the rear side of an ear are referred to the ear of the user. Furthermore, there is also a tragus 109 at the periphery of the ear canal of the ear 100. Compared to parts such as the concha cavity, the cymba conchae, and the triangular fossa, etc., each of which has a certain depth and a certain volume in the three-dimensioned space and are recessed towards the rear side of the ear along a direction close to the user's head, the tragus is raised towards the front side of the ear along a direction away from the user's head.

It is well known in the fields of medicine and anatomy, three basic sections of the human body include a Sagittal Plane, a Coronal Plane, and a Horizontal Plane, as well as three basic axes include a Sagittal Axis, a Coronal Axis, and a Vertical Axis. The sagittal plane is a vertical plane which passes from ventral (front) to dorsal (rear) dividing the human body into right and left halves. The coronal plane is any vertical plane that divides the body into ventral and dorsal (belly and back) sections. The horizontal plane is parallel to the ground plane and divides the human body into upper and lower (or top and bottom) parts. Correspondingly, the sagittal axis is an axis that passes perpendicularly through the coronal plane along the front-rear direction of the human body, the coronal axis is an axis that passes perpendicularly through the sagittal plane along the left-right direction of the human body, and the vertical axis is an axis that passes perpendicularly through the horizontal plane along the top-bottom direction of the human body. Based on this, combined with FIG. 1, three directions X, Y, and Z may be simply regarded as the coronal axis of the human body, the sagittal axis of the human body, and the vertical axis of the human body respectively; the three planes XY, XZ, and YZ may be simply regarded as the horizontal plane of the human body, the coronal axis of the human body and the sagittal plane of the human body respectively.

Figure 2:
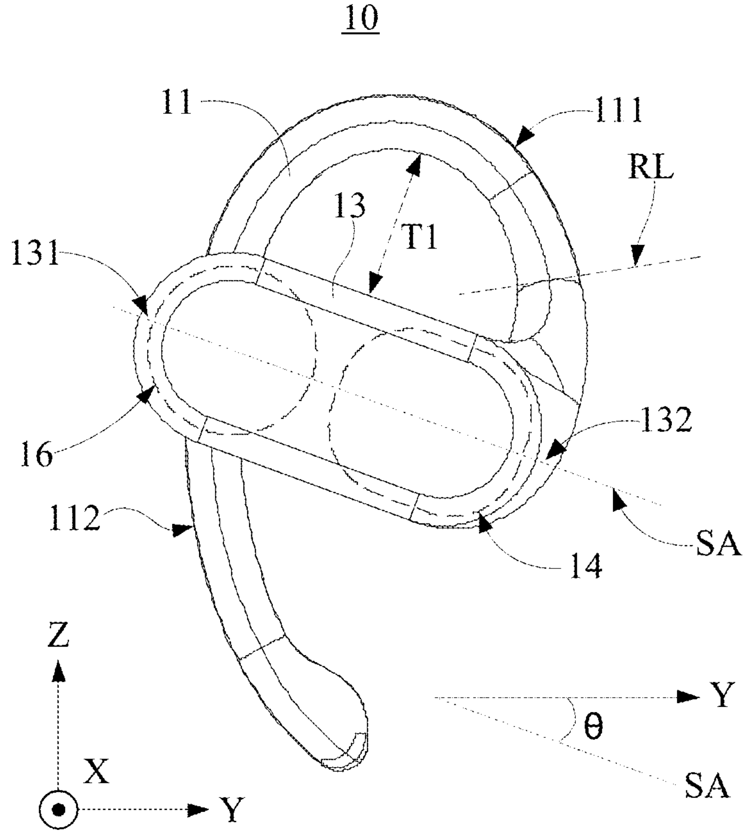
FIG. 2 is a schematic diagram illustrating an exemplary main-view structure of an earphone according to one embodiment of the present disclosure.
Figure 3:
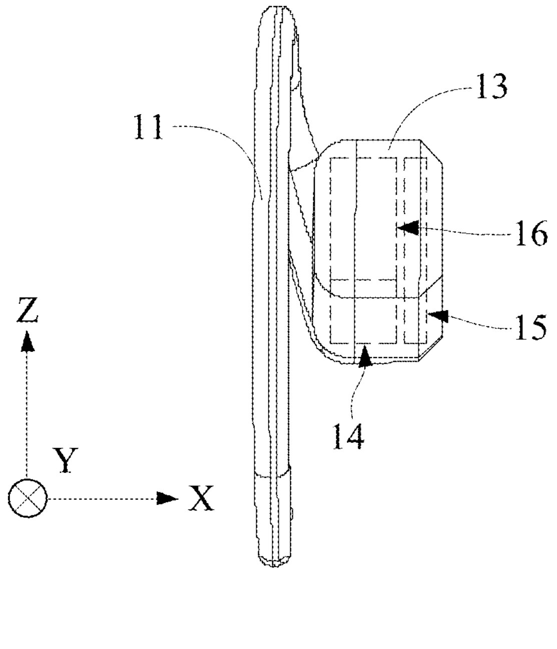
FIG. 3 is a schematic diagram illustrating an exemplary left-view structure of the earphone in FIG. 2.

In conjunction with FIG. 2 and FIG. 3, the earphone 10 may include a hook portion 11 and a retention portion 13 connected to the hook portion 11. At least a part of the hook portion may be configured to hang between a rear side of an ear of a user and the head of the user. The retention portion 13 may be configured to allow the hook portion 11 and the retention portion 13 to clamp the ear together by contacting a front side of the ear. In other words, the hook portion 11 and the retention portion 13 may be non-coplanar in the three-dimensioned space. The retention portion 13 may include a thickness direction, a length direction, and a width direction that are orthogonal to each other. The thickness direction is defined as a direction in which the retention portion 13 is close to or far away from the ear in a wearing state. A length of the retention portion 13 along the length direction is greater than or equal to a width of the retention portion 13 along the width direction. Based on this, the hook portion 11 may include a connection segment 111 connected to the retention portion 13 and a free segment 112 connected to the connection segment 111. The connection segment 111 and the free segment 112 are located on opposite sides of the retention portion 13 along the width direction, respectively. Further, in a reference plane perpendicular to the thickness direction (e.g., a plane where a paper surface is located), a maximum spacing between the connection segment 111 and the retention portion 13 along the width direction (e.g., as shown by T1 in FIG. 2) may be in a range of 10 mm to 17 mm. For example, the maximum spacing may be in a range of 11 mm to 14 mm. In this arrangement, this is conducive to both increasing a distance between the center of gravity of the retention portion 13 and an upper auricular root of the ear (e.g., lowering the center of gravity of the retention portion 13 in the wearing state), and increasing a distance between a mass center of the retention portion 13 and an antihelix of the ear (e.g., increasing rotational inertia of the earphone 10 with respect to the antihelix or the upper auricular root of the ear when the user moves (e.g., shaking the head from the left side to the right side, lowering the head and lifting the head, and bouncing up and down)), thereby improving the stability of the earphone 10 when the earphone 10 is worn.

It should be noted that it is possible to produce a simulator with a head and (left and right) ears based on ANSI: S3.36, S3.25 and IEC: 60318-7 standards, such as GRAS 45BC KEMAR. Therefore, the descriptions of "a user wears an earphone" or "an earphone is in a wearing state" in the present disclosure refers to the earphone being worn on an ear of the simulator. Based on this, the "wearing state" described in the present disclosure refers to a normal wearing state after the earphone is worn on the ear of the simulator, and for the sake of convenience, the normal wearing state may be further illustrated from the front side, rear side and other views, such as a normal wearing state shown in FIG. 4 and FIG. 5. Of course, due to the individual differences of the users, an actual wearing state of the earphone 10 may have some differences compared to the normal wearing state. Furthermore, the center of gravity in the present disclosure refers to a point of a combined gravitational pull of the earth on each tiny portion of an object, and the mass center described in the present disclosure refers to a hypothetical point at which the mass is believed to be concentrated in the physical system. Generally, it can be simply assumed that the gravitational field of our environment is homogeneous, and thus the mass center and the center of gravity may simply be treated as coinciding. Based on this, a plumb line may be used to find the center of gravity of an object (e.g., the retention portion 13). In this regard, in order to facilitate the measurement of the center of gravity of the retention portion 13, the retention portion 13 may be first detached from the earphone 10 along a reference line RL shown in FIG. 2. Based on this, the reference line RL may be a division line between the hook portion 11 and the retention portion 13. For example, if an elastic wire is disposed inside the hook portion 11, and the retention portion 13 is a plastic member, the hook portion 11 and the retention portion 13 are connected in a plug-in connection, then the retention portion 13 may be removed from the earphone 10 by destroying the plug-in connection between the hook portion 11 and the retention portion 13. As another example, if the hook portion 11 and the retention portion 13 are plastic members, and the hook portion 11 and the retention portion 13 are connected by at least one of a glued connection, a snap-in connection, or a plug-in connection, then the retention portion 13 may also be removed from the earphone 10 by destroying the connection between the hook portion 11 and the retention portion 13.

Figure 4:
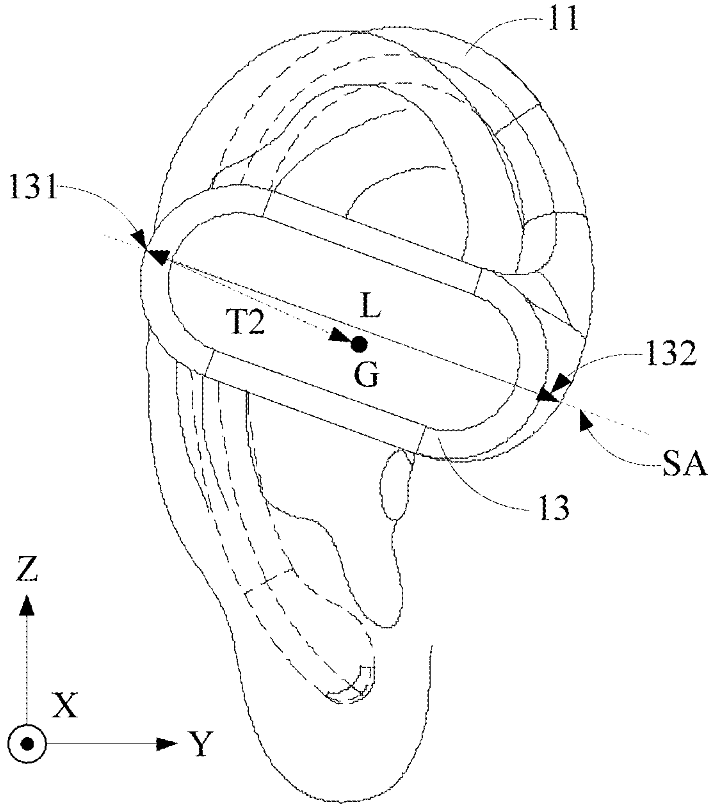
FIG. 4 is a schematic diagram illustrating a front view of the earphone in FIG. 2 in a wearing state, viewed along a coronal axis of the user.
Figure 5:
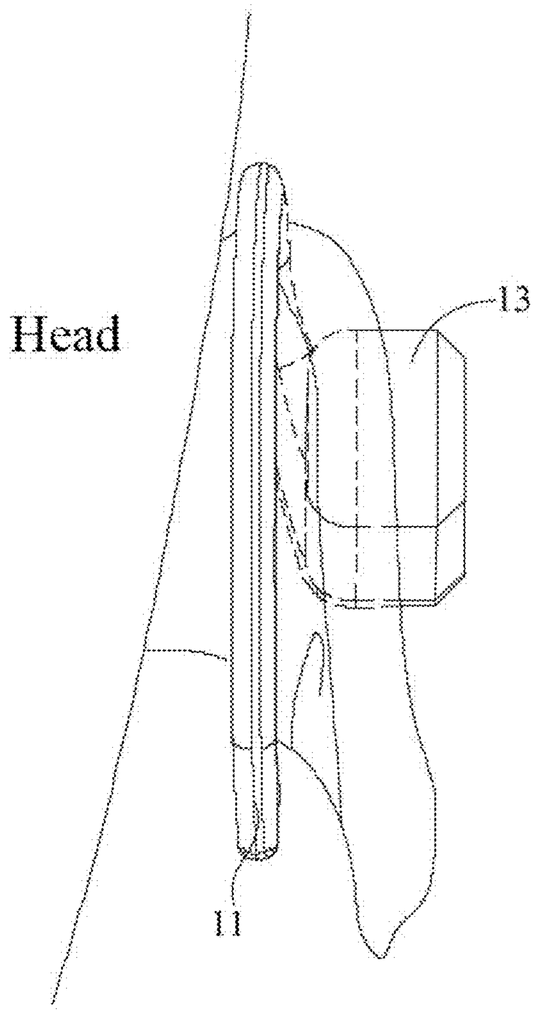
FIG. 5 is a schematic diagram illustrating a rear view of the earphone in FIG. 2 in the wearing state, viewed along a sagittal axis of the user.

Furthermore, the earphone 10 may further include a mechanism 14, a main board 15, and a battery 16. The mechanism 14 is mainly configured to convert an electrical signal into corresponding mechanical vibrations (that is, "generation of sound"). The mechanism 14 may be electrically connected to the main board 15 and the battery 16 through a corresponding conductor. The main board 15 is mainly configured to control the generation of sound of the mechanism 14. The battery 16 is mainly configured to provide electrical energy to the generation of sound of the mechanism 14. The earphone 10 described in the present disclosure may also include a sound-transmission device such as a microphone and a sound pickup. The earphone 10 may further include a communication device such as Bluetooth. The sound-transmission device and the communication device are electrically connected to the main board 15 and the battery 16 through a corresponding conductor to realize corresponding functions. Furthermore, when the earphone 10 is in the wearing state, since the retention portion 13 is mainly located on the front side of the user's ear as shown in FIG. 4, the retention portion 13, in addition to being configured to provide with the mechanism 14, may also be provided with some functional buttons that facilitate the user's interaction with the earphone 10. Based on this, the main board 15 may also be provided in the retention portion 13 in order to shorten an alignment distance between the mechanism 14 and other functional buttons (e.g., the main board 15).

For example, in conjunction with FIG. 4 and FIG. 2, in the wearing state and when viewed along a direction in which the coronal axis of the user is located, an angle (as shown by 0) between a length direction of the retention portion 13 and a direction in which the sagittal axis of the user is located may be in a range of 15 degrees to 60 degrees. For example, the angle may be in a range of 25 degrees to 45 degrees. In conjunction with FIG. 4 and FIG. 2, since the retention portion 13 is a regular structure (e.g., a profile of the retention portion 13 is a rounded rectangle), such that the retention portion 13 is symmetrically, at least in profile, with respect to a symmetry axis (e.g., a dotted line SA) parallel to the length direction of the retention portion 13. That is, the angle θ may be an angle between the symmetry axis SA and the sagittal axis of the user.

In some embodiments, as shown in FIG. 2, the retention portion 13 has a free end 131 that is not connected to the hook portion 11 and a connection end 132 that is connected to the hook portion 11. The free end 131 of the retention portion 13 may be located closer to an end of the free segment 112 of the hook portion 11 that is further away from the connection segment 111, compared to the connection end 132 of the retention portion 13. At this time, in the wearing state and when viewed along the direction where the coronal axis of the user is located, as shown in FIG. 4, the free end 131 of the retention portion 13 that is not connected to the hook portion 11 is closer to the top of the user's head as compared to the connection end 132 of the retention portion 13 that is connected to the hook portion 11. In this manner, the retention portion 13 is provided inclined with respect to the sagittal axis of the user so that the retention portion 13 is inclined toward the ear canal of the ear in the wearing state. Thus, the distance between the center of gravity of the retention portion 13 and the upper auricular root of the ear is increased (that is, the center of gravity of the retention portion 13 in the wearing state is lowered), thereby improving the stability of the earphone 10 when the earphone 10 is worn.

For example, in conjunction with FIG. 4, in the wearing state, the free end 131 of the retention portion 13 contacts the antihelix of the ear so that at least a part of the retention portion 13 presses against the ear at the antihelix of the ear; at least a part of the retention portion 13 overlaps with the concha cavity of the ear when projected orthogonally to the ear along the direction in which the coronal axis of the user is located (e.g., at least a part of the concha cavity of the ear is covered by the retention portion 13). For example, in the wearing state, at least a part of the retention portion 13, when projected orthogonally to the ear along the direction in which the coronal axis of the user is located, is staggered from the ear canal of the ear (e.g., at least a part of the ear canal of the ear is not covered by the retention portion 13), so to "liberate" the ear canal of the ear. In this way, compared to the related art in which at least a part of the cymba conchae of the ear is covered by the retention portion 13, in the present disclosure, a part of the concha cavity of the ear is covered by the retention portion 13 (that is, the retention portion 13 is tilted towards the ear canal of the ear in the wearing state), so that a distance between the mass center of the retention portion 13 and the antihelix of the ear is increased (e.g.,, the rotational inertia of the earphone 10 with respect to the antihelix or the upper auricular root of the ear is increased when the user moves (such as shaking the head from the left side to the right side, raising and lowering the head, and bouncing up and down)), thus the stability of the earphone 10 when the earphone 10 is worn is improved.

For example, in conjunction with FIG. 4, a ratio of a distance between the center of gravity of the retention portion 13 (e.g., as shown in G) and the free end 131 of the retention portion 13 (e.g., as shown in T2) to a length of the retention portion 13 (e.g., as shown in L) on a reference plane (e.g., the YZ plane) in which the sagittal plane of the user is located may be in a range of 0.5 to 0.75. In this manner, under other conditions such as the retention portion 13 is disposed inclinedly, the center of gravity of the retention portion 13 is further away from the free end 131 of the retention portion 13, so that the distance between the center of gravity of the retention portion 13 and the antihelix of the ear is increased (that is, the rotational inertia of the earphone 10 with respect to the antihelix or the upper auricular root of the ear is increased when the user moves such as shaking the head from the left side to the right side, raising and lowering, and bouncing up and down), thus the stability of the earphone 10 when the earphone is worn is improved. The reference plane where the sagittal plane of the user is located may also be defined as a reference plane perpendicular to the thickness direction of the retention portion 13.

Further, the length (e.g., shown by Lin FIG. 4) of the retention portion 13 may be in a range of 25 mm to 32 mm. For example, the length may be in a range of 25 mm to 32 mm. When the length of the retention portion 13 is too short (for example, the retention portion 13 is so short that it cannot contact the antihelix of the ear), it is unfavorable for the retention portion 13 to clamp the user's ear together with the hook portion 11. When the length of the retention portion 13 is too long (for example, the retention portion 13 is so long that a large part of the retention portion extends out the helix of the ear), it may easily cause the earphone 10 to be touched by the user or a third party, which is unfavorable to the reliability of the earphone 10 when the earphone 10 is worn.

Furthermore, along the length direction of the retention portion 13 and along a positive direction from the free end 131 of the retention portion 13 to the connection end 132 of the retention portion 13, a ratio of a width of the retention portion 13 at ¾ of its length to a width of the retention portion 13 at ¼ of its length may be in a range of 1 to 2. For example, the ratio may be in a range of 1 to 1.3. In this way, it is advantageous to cause the center of gravity (i.e., the mass center) of the retention portion 13 to be shifted toward the connection end 132 of the retention portion 13, thereby facilitating an increase in the distance between the center of gravity of the retention portion 13 and the upper auricular root of the ear, as well as an increase in the distance between the mass center of the retention portion 13 and the antihelix of the ear.

Based on the above description, the mechanism 14 may be provided in the retention portion 13, and the retention portion 13 may also be tilted towards the ear canal of the ear in the wearing state, so that the mechanism 14 may be located at the connection end 132 of the retention portion 13 to shorten a distance between the mechanism 14 (which may specifically be a sound outlet hole on the retention portion 13) and the ear canal of the ear, thereby increasing an intensity of a sound emitted from the mechanism 14 heard by the user. Furthermore, if the connection end 132 of the retention portion 13 is wider than the free end 131 of the retention portion 13, a volume of the mechanism 14 that may be accommodated by the connection end 132 of the retention portion 13 may also be larger, thereby increasing the intensity of the sound emitted from the mechanism 14.

Exemplarily, the battery 16 may be disposed in the hook portion 11 (not shown in the figures). Specifically, the battery 16 may be located close to the free segment 112 of the hook portion 11. According to such arrangement, a capacity of the battery 16 is increased and a weight distribution of the earphone 10 is equalized.

For example, in FIG. 2 and FIG. 3, the mechanism 14, the main board 15, and the battery 16 may be located inside the retention portion 13. In this way, since there is no interference from the battery 16, the hook portion 11 may be imitatively designed as a structure (a mimic structure) that fits well with the rear side of the ear (as well as the head), which is conducive to improving the stability of the earphone 10 when the earphone 10 is worn. The mechanism 14 may be disposed at the connection end 132 of the retention portion 13 and the battery 16 may be disposed at the free end 131 of the retention portion 13. By this time, a position of the center of gravity of the retention portion 13 may be adjusted by changing the volume of the mechanism 14, the capacity of the battery 16, and other parameters. For example, the battery 16 is located closer to the free end 131 compared to the mechanism 14, and a dimension of the mechanism 14 along the width direction of the retention portion 13 is larger than a dimension of the battery 16 along the width direction.

Figure 6:
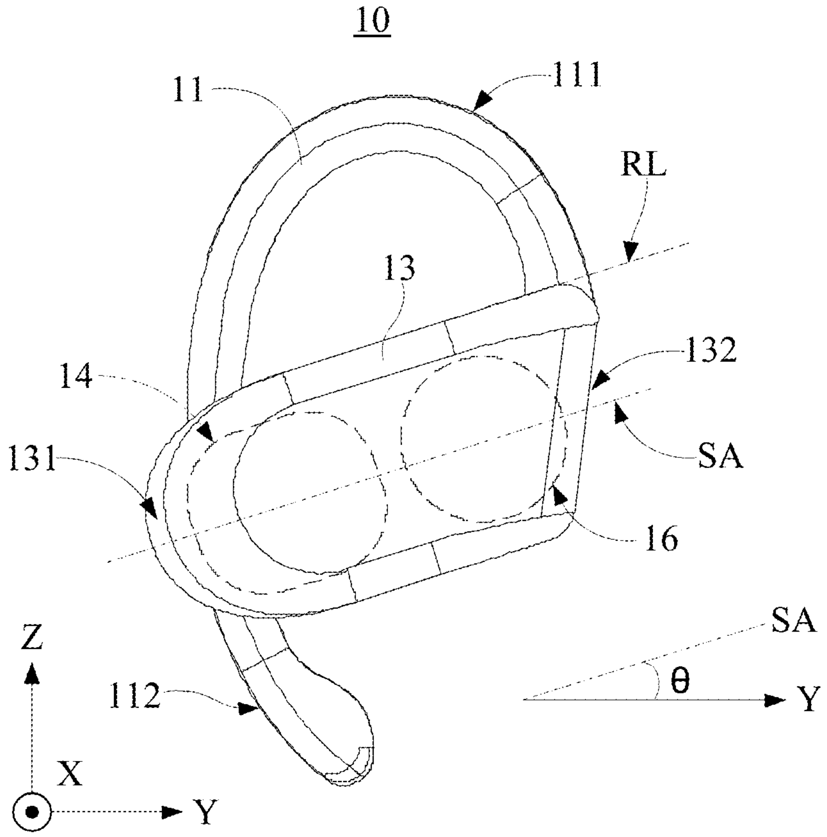
FIG. 6 is a schematic diagram illustrating an exemplary main-view structure of the earphone according to one embodiment of the present disclosure.
Figure 8:
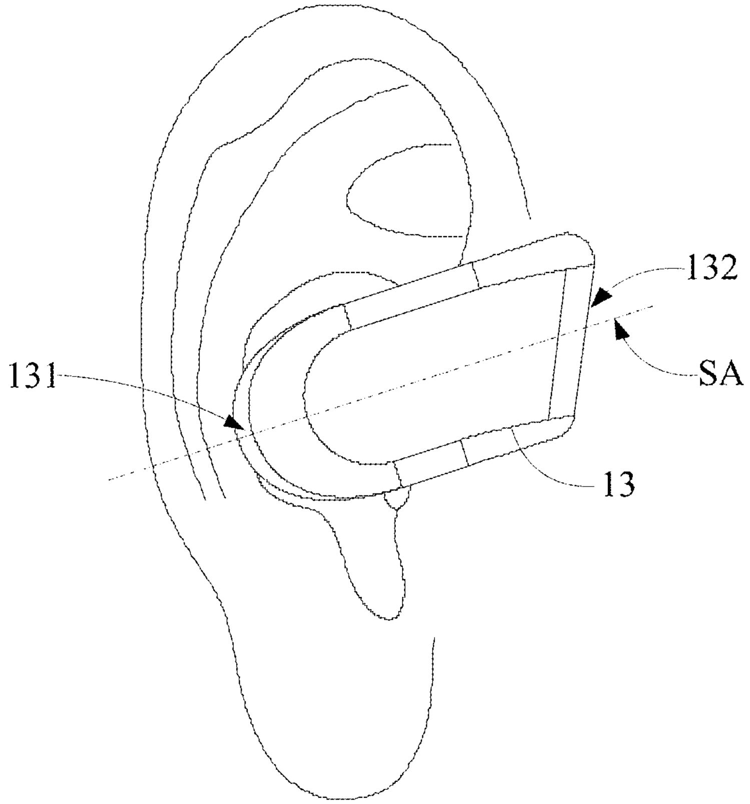
FIG. 8 is a schematic diagram illustrating a front view of the earphone in FIG. 6 in a wearing state, viewed along the coronal axis of the user.
Figure 9:
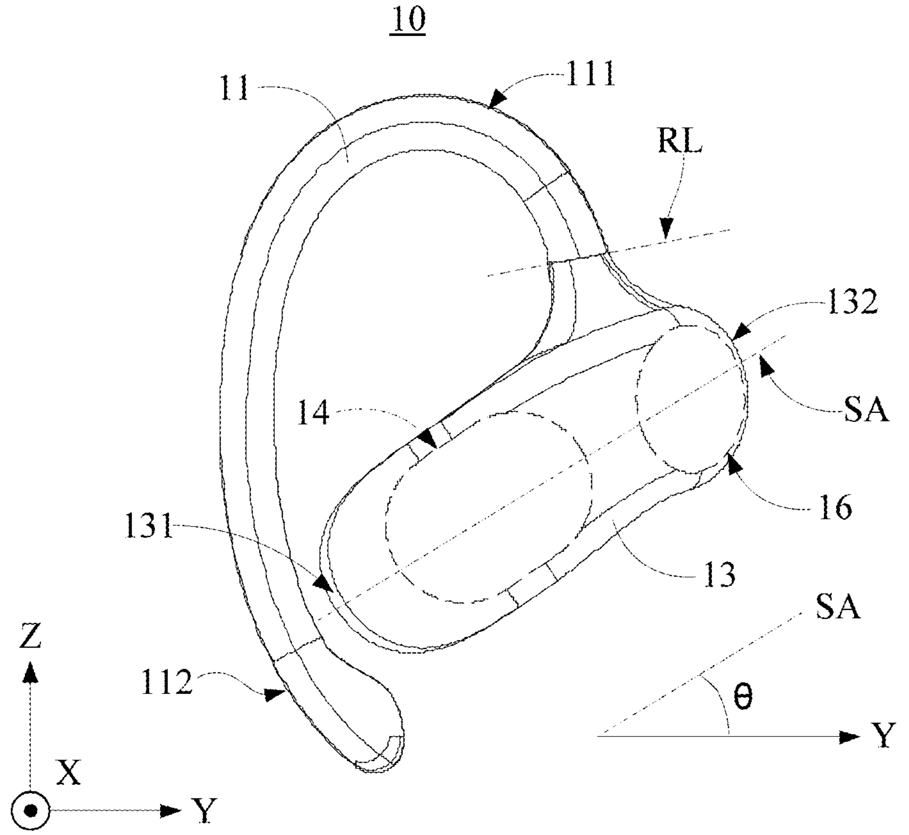
FIG. 9 is a schematic diagram illustrating an exemplary main-view structure of the earphone according to one embodiment of the present disclosure.
Figure 11:
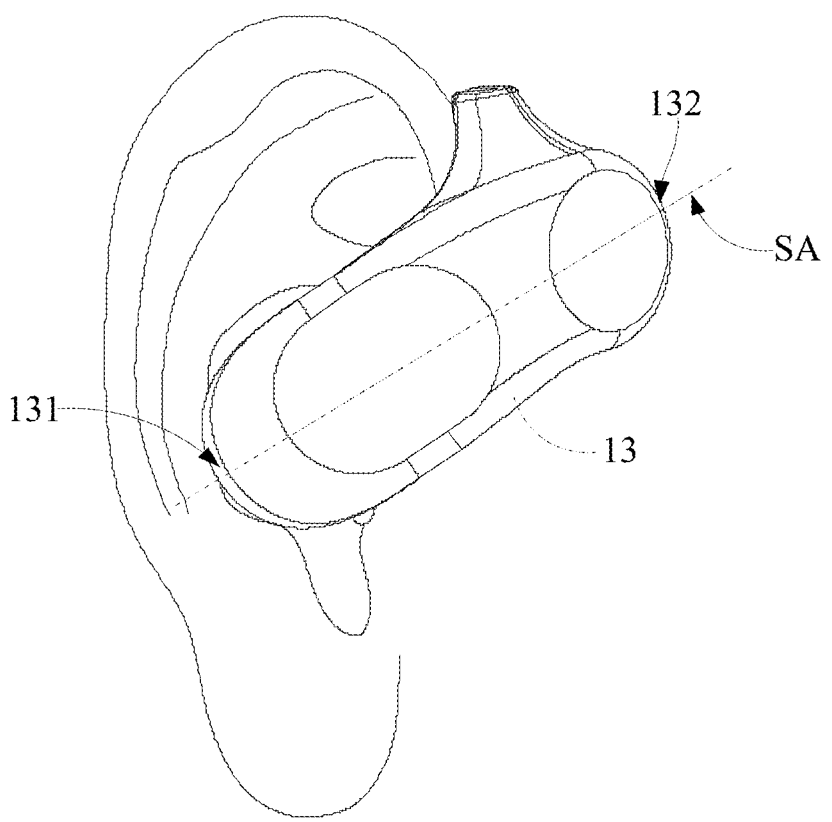
FIG. 11 is a schematic diagram illustrating a front view of the earphone in FIG. 9 in the wearing state, viewed along the coronal axis of the user.

In some other embodiments, such as shown in FIG. 6 or FIG. 9, the free end 131 of the retention portion 13 may be located closer to an end of the free segment 112 of the hook portion 11 that is further away from the connection segment 111, compared to the connection end 132 of the retention portion 13. At this time, in the wearing state and when viewed along the direction in which the coronal axis of the user is located, as shown in FIG. 8 or FIG. 11, the free end 131 of the retention portion 13 that is not connected to the hook portion 11 is further away from the top of the user's head compared to the connection end 132 of the retention portion 13 that is connected to the hook portion. In this way, the retention portion 13 is also provided inclinedly with respect to the sagittal axis of the user so as to increase the distance between the center of gravity of the retention portion 13 and the upper auricular root of the ear (e.g., lower the center of gravity of the retention portion 13 in the wearing state), thereby improving the stability of the earphone 10 the earphone 10 is worn.

For example, in the wearing state, the free end 131 of the retention portion 13 that is not connected to the hook portion 11 may extend into the concha cavity of the ear to allow the retention portion 13 to be inclinedly disposed with respect to the sagittal axis of the user. Similar to the above embodiment, the mechanism 14, the main board 15, and the battery 16 may likewise be disposed inside the retention portion 13 to prevent the mimic structure of the hook portion 11 from interfering with the battery 16. A main difference with the above embodiment is that the mechanism 14 may be closer to the free end 131 as compared to the battery 16, in order to shorten the distance between the mechanism 14 (which may specifically be the sound outlet hole on the retention portion 13) and the ear canal of the ear. Thus, the intensity of the sound from the mechanism 14 heard by the user is increased. It is worth noting that, in the present embodiment, although the free end 131 of the retention portion 13 is provided so as to extend into the concha cavity of the ear, the retention portion 13 does not extend into the ear canal of the ear, so as to "liberate" the ear canal. Taking into account differences between different populations, the retention portion 13 may cover a portion of the ear canal in the wearing state, and such a scenario should not be confused with a scenario in which the retention portion 13 directly inserts into the ear canal.

Furthermore, the free end 131 of the retention portion 13 may rest against or press against on an inner side of the concha cavity of the ear. For example, the retention portion 13 rests against the inner side of the concha cavity of the ear along a length direction of the retention portion 13. As another example, the retention portion 13 presses against the inner side of the concha cavity of the ear along a thickness direction of the retention portion 13. In this manner, in addition to the hook portion 11 exerting a force such as a gripping force and a friction force on a rear side of the ear, the retention portion 13 may also form a force such as a resisting force, or the gripping force, and the friction force with the inner side of the concha cavity of the ear, thereby improving the wearing of the earphone 10 when the earphone 10 is worn.

Furthermore, inventors of the present disclosure have found out based on long-term research that: when the free end 131 of the retention portion 13 is provided to extend into the concha cavity of the ear, at least a portion of the retention portion 13 may cover the tragus of the ear. However, the tragus of the ear generally protrudes toward the front side of the ear along a direction away from the head of the user, making it easy to be held down by the retention portion 13, and easy to cause discomfort for the user when wearing the earphone 10 for a long period. To this end, the retention portion 13 is provided to avoid the tragus of the ear in the wearing state, so as to avoid squeezing the tragus of the ear, thereby improving the comfort of the earphone 10 when the earphone 10 is worn.

Figure 7:
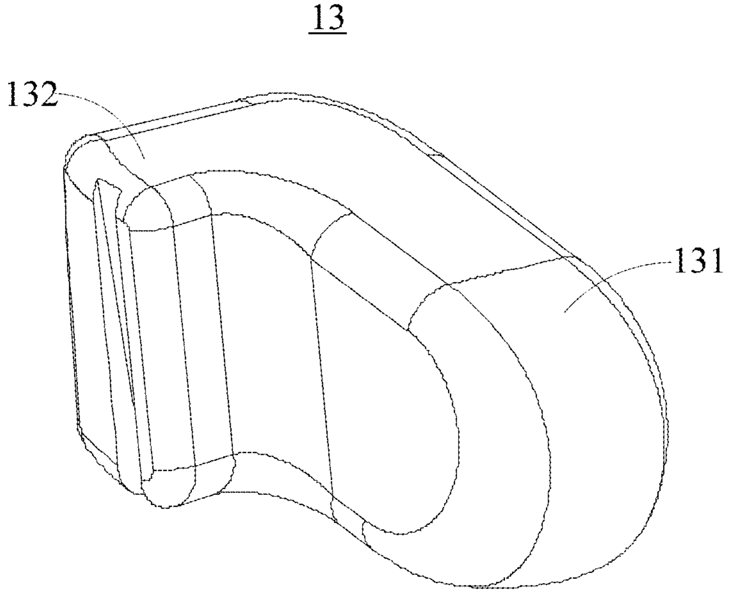
FIG. 7 is a schematic diagram illustrating an exemplary structure of a retention portion in FIG. 6 facing an ear.

As exemplary, in conjunction with FIG. 6 and FIG. 7, on an inner side of the retention portion 13 facing the ear, a portion of the connection end 132 of the retention portion 13 protrudes compared to the free end 131, so that the inner side of the retention portion 13 facing the ear in whole is not planar. In the wearing state, the connection end 132 of the retention portion 13 is in contact with the skin around the tragus such that other regions of the retention portion 13 avoid contacting with the ear screen of the ear. Further, since a portion of the connection end 132 of the retention portion 13 protrudes with respect to the free end 131, and the battery 16 may be provided at the connection end 132 of the retention portion 13, a dimension of the battery 16 along a thickness direction of the retention portion 13 is increased and a capacity of the battery 16 is increased, thereby prolonging a standby/usage time of the earphone 10.

Figure 10:
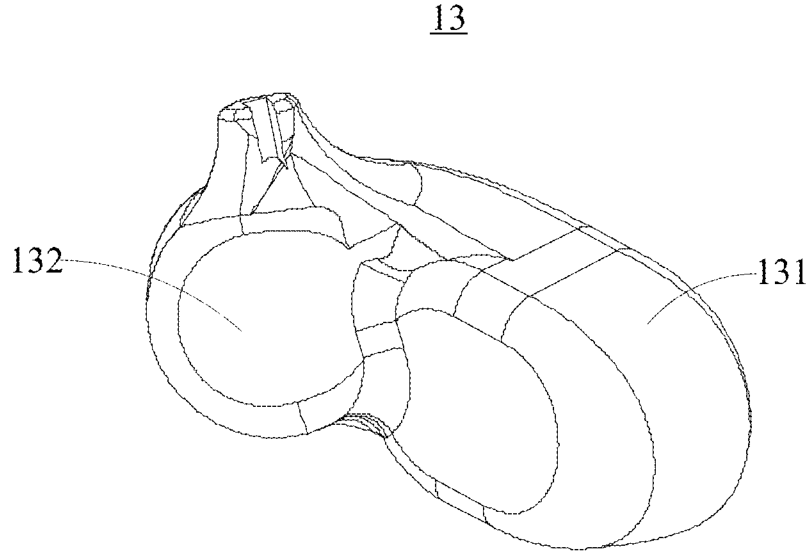
FIG. 10 is a schematic diagram illustrating an exemplary structure of the retention portion in FIG. 9 facing the ear.

Exemplarily, in conjunction with FIG. 9 and FIG. 10, the connection end 132 of the retention portion 13 is bent with respect to the free end 131 so that the retention portion 13 in whole is not planar. In the wearing state, the connection end 132 of the retention portion 13 is in contact with the skin around the tragus, such that other regions of the retention portion 13 avoid contacting with the tragus of the ear. Furthermore, as the connection end 132 of the retention portion 13 is bent with respect to the free end 131, and the mechanism 14 and the battery 16 may be disposed at the free end 131 and the connection end 132 of the retention portion 13, respectively, a bend between the connection end 132 and the free end 131 of the retention portion 13 may correspond exactly between the mechanism 14 and the battery 16.

It should be noted that, for two embodiments shown in FIG. 6 to FIG. 11, a main difference is as follows: a position of the connection end 132 of the retention portion 13 that contacts with the skin of the user in the wearing state according to the embodiments shown in FIG. 9 to FIG. 11, is closer to the upper auricular root of the ear (e.g., closer to the top of the head of the user) compared to that of the embodiments shown in FIG. 6 to FIG. 8.

In addition to optimizing the retention portion 13 and related structures therein, a weight distribution of the earphone 10 and the gripping force provided by the earphone 10 are optimized, which is also beneficial in improving the stability of the earphone 10 when the earphone 10 is worn.

Exemplarily, a ratio of a mass of the hook portion 11 to a mass of the retention portion 13 may be in a range of 1/9 to 1/2. For example, the ratio may be in a range of 1/6.5 to 1/3.5. In this way, in other cases such as when the distance between the center of gravity of the retention portion 13 and the upper auricular root of the ear is constant, and when the distance between the mass center of the retention portion 13 and the antihelix of the ear is constant, the mass of the hook portion 11, the mass of the retention portion 13 and other parameters may be adjusted to increase the stability of the earphone 10 the earphone 10 is worn. When the earphone 10 is cut along the reference line RL shown in FIG. 2, one portion of the earphone 10 may be regarded as the retention portion 13 and the other portion of the earphone 10 may be regarded as the hook portion 11 so as to measure the mass of the hook portion 11 and the retention portion 13, respectively.

In some embodiments, the hook portion 11 may include an elastic wire connected with the retention portion 13 and an elastic over-molded body encasing the elastic wire, the elastic wire is mainly configured to enable the hook portion 11 to cooperate with the retention portion 13 to provide a corresponding gripping force, and the elastic over-molded body is mainly configured to improve the comfort of the hook portion 11 when the earphone 10 is worn and the fit between the rear side of the ear (as well as the head). A thickness of the elastic over-molded body may be in a range of 1 mm to 3.5 mm. For example, the thickness may be in a range of 1.5 mm to 2.5 mm. Further, the Shore hardness of the elastic over-molded body may be in a range of 0 A to 40 A. For example, the Shore hardness may be in a range of 0 A to 10 A. Correspondingly, a material of the elastic over-molded body may be one of silicone, foam sponge, thermoplastic polyurethane elastomer, thermoplastic elastomer, or the like or a combination thereof. Considering that the elastic over-molded body needs to be in contact with the skin of the user, the material of the elastic over-molded body may be a single silicone gel or a thermoplastic polyurethane elastomer, or a composite structure of a sponge and a silicone gel, such the sponge encases the elastic wire and the silicone encases the sponge.

In some embodiments, the retention portion 13 may include a housing and an elastic overlay encasing the housing. The housing is primarily configured to accommodate structural components such as the mechanism 14, the main board 15, the battery 16, etc., as well as to cooperate with the hook portion 11 to provide a corresponding gripping force. The elastic overlay is mainly configured to improve the wearing comfort of the retention portion 13 and the fit with the front side of the ear. Similarly, a thickness of the elastic overlay may be in a range of 1 mm to 3.5 mm. For example, the thickness may be in a range of 1.5 mm to 2.5 mm. Further, the Shore hardness of the elastic overlay may be in a range of 0 A to 40 A. For example, the Shore hardness may be in a range of 0 A to 10 A. Correspondingly, a material of the elastic overlay may be one of silicone, foam sponge, thermoplastic polyurethane elastomer, thermoplastic elastomer, etc., or a combination thereof. Considering that the elastic overlay needs to be in contact with the skin of the user, the material of the elastic overlay may be a single silicone gel, a thermoplastic polyurethane elastomer, or a composite structure of a sponge and a silicone gel. For example, the sponge encases the housing and the silicone gel encases the sponge. Furthermore, for the composite structure of the sponge and the silicone, the sponge may be predominantly disposed at the free end 131 of the retention portion 13 such that the retention portion 13 is in contact with the ear via the sponge and the silicone thereon. For example, a region of the retention portion 13 in which the sponge is disposed is softer than other regions. The region of the retention portion 13 in which the sponge is located may have an area greater than 2×2 $mm^2$. For example, the area may be greater than 5×5 $mm^2$.

Exemplarily, the gripping force exerted by the retention portion 13 and the hook portion 11 on the ear of the user in the wearing state may be in a range of 0.1 N to 0.5 N. For example, the gripping force may be in a range of 0.15 N to 0.3 N. A gripping force that is too large is detrimental to the comfort of the earphone 10 the earphone 10 is worn, while a gripping force that is too small is detrimental to the stability of the earphone 10 the earphone 10 is worn.

It should be noted that the gripping force described in the present disclosure may be measured with the aid of a tensiometer. For example, the earphone 10 is worn on the ear of the simulator or the user (e.g., in the wearing state), the tensiometer is then fixed to a side of the retention portion 13 back away from the ear, and the tensiometer is pulled, and observed. When a side of the retention portion 13 faces the user's ear is just separated from the user's skin, a tension force shown on the tensiometer is read. The tension force may be simply regarded as the gripping force.

Furthermore, a portion of the hook portion 11 may overlap with the retention portion 13 when the hook portion 11 is projected orthogonally to the retention portion 13 along the thickness direction of the retention portion 13. In this way, in the wearing state, the hook portion 11 and the retention portion 13 not only can press the ear from both the front side and the rear side of the ear, but also the gripping force mainly manifests as a compressive stress, which is conducive to improve the wearing stability and comfort.

The foregoing is only a part of the embodiments of the present disclosure, and is not intended to limit the scope of protection of the present disclosure, and any equivalent device or equivalent process transformations utilizing the contents of the present disclosure and the accompanying drawings, or applying them directly or indirectly in other related technical fields, are similarly included in the scope of patent protection of the present disclosure.

What is claimed is:

1. An earphone, comprising a hook portion and a retention portion connected to the hook portion, wherein at least a part of the hook portion is configured to hang between a rear side of an ear of a user and the head of the user, the retention portion is configured to contact a front side of the ear, and in a wearing state, a free end of the retention portion that is not connected to the hook portion extends into a concha cavity of the ear, wherein a ratio of a mass of the hook portion to a mass of the retention portion is in a range of 1/9 to 1/2.

2. The earphone of claim 1, wherein the free end of the retention portion rests against or is pressed against an inner side of the concha cavity of the ear.

3. The earphone of claim 2, wherein the retention portion includes a thickness direction, a length direction, and a width direction that are orthogonal to each other, the thickness direction is defined as a direction in which the retention portion is close to or far away from the ear in the wearing state, a length of the retention portion along the length direction is greater than or equal to a width of the retention portion along the width direction, the retention portion rests against the inner side of the concha cavity of the ear along the length direction, or the retention portion is pressed against the inner side of the concha cavity of the ear along the thickness direction.

4. The earphone of claim 2, wherein the retention portion does not extend into an ear canal of the ear.

5. The earphone of claim 1, wherein the retention portion is disposed in a manner that avoids a tragus of the ear in the wearing state.

6. The earphone of claim 5, wherein on an inner side of the retention portion facing the ear, a connection end connecting the retention portion and the hook portion is partially protruded compared to the free end of the retention portion, so that in the wearing state, the connection end of the retention portion is in contact with skin around the tragus of the ear, and other regions of the retention portion avoid the tragus of the ear.

7. The earphone of claim 5, wherein a connection end connecting the retention portion and the hook portion is bent with respect to the free end of the retention portion, so that in the wearing state, the connection end of the retention portion is in contact with skin around the tragus of the ear, and other regions of the retention portion avoid the tragus of the ear.

8. The earphone of claim 1, wherein the retention portion includes a thickness direction, a length direction, and a width direction that are orthogonal to each other, the thickness direction is defined as a direction in which the retention portion is close to or far from the ear in the wearing state, a length of the retention portion along the length direction of the retention portion is greater than or equal to a width of the retention portion along the width direction, and in the wearing state and viewed along a direction in which a coronal axis of the user is located, an angle between the length direction and the direction in which the sagittal axis of the human body is located is in a range of 15 degrees to 60 degrees.

9. The earphone of claim 1, wherein in the wearing state, a gripping force exerted by the retention portion and the hook portion on the ear is in a range of 0.1N to 0.5N.

10. The earphone of claim 1, wherein the hook portion includes a connection segment connected to the retention portion and a free segment connected to the connection segment, and the connection segment and the free segment are located on opposite sides of the retention portion along a width direction of the retention portion.

11. The earphone of claim 10, wherein in a reference plane perpendicular to a thickness direction of the retention portion, a maximum spacing between the connection segment and the retention portion along the width direction is in a range of 10 mm to 17 mm.

12. The earphone of claim 10, further comprising:

a mechanism configured to convert an electrical signal into mechanical vibrations to produce a generation of sound;

a main board configured to control the generation of sound of the mechanism; and a battery.

13. The earphone of claim 12, wherein the battery disposed in the hook portion.

14. The earphone of claim 13, wherein the battery is located close to the free segment of the hook portion.

15. The earphone of claim 12, wherein the mechanism and the main board are provided in the retention portion.

16. The earphone of claim 12, wherein the mechanism, the main board, and the battery are located inside the retention portion.

17. The earphone of claim 1, wherein a ratio of a distance between a center of gravity of the retention portion and the free end of the retention portion to a length of the retention portion on a reference plane in which a sagittal plane of the user is located is in a range of 0.5 to 0.75.

18. The earphone of claim 1, wherein a length of the retention portion is in a range of 25 mm to 32 mm.

19. The earphone of claim 6, wherein along a length direction of the retention portion and along a positive direction from the free end of the retention portion to the connection end of the retention portion, a ratio of a width of the retention portion at ¾ of its length to a width of the retention portion at ¼ of its length is in a range of 1 to 2.

20. The earphone of claim 1, wherein the hook portion includes an elastic wire connected with the retention portion and an elastic over-molded body encasing the elastic wire, and the elastic wire is configured to enable the hook portion to cooperate with the retention portion to provide a corresponding gripping force.

* * * * *